United States Patent
Salter et al.

(10) Patent No.: US 11,420,616 B2
(45) Date of Patent: Aug. 23, 2022

(54) ONBOARD ENGINE CONTROL FOR VEHICLES

(71) Applicant: Ford Global Technologies, LLC, Dearborn, MI (US)

(72) Inventors: Stuart Salter, White Lake, MI (US); Zeljko Deljevic, Plymouth, MI (US); Anthony Spoto, Birmingham, MI (US); Michael Irby, Monroe, MI (US); Ben Chen, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 483 days.

(21) Appl. No.: 16/458,153

(22) Filed: Jun. 30, 2019

(65) Prior Publication Data
US 2020/0406886 A1 Dec. 31, 2020

(51) Int. Cl.
*B60W 20/20* (2016.01)
*B60W 20/13* (2016.01)
*F02N 11/08* (2006.01)

(52) U.S. Cl.
CPC ............ *B60W 20/20* (2013.01); *B60W 20/13* (2016.01); *Y02T 10/40* (2013.01)

(58) Field of Classification Search
USPC ........................................................ 701/532
See application file for complete search history.

(56) References Cited

U.S. PATENT DOCUMENTS

| | | | |
|---|---|---|---|
| 6,532,926 | B1 | 3/2003 | Kuroda et al. |
| 7,562,535 | B2 | 7/2009 | Deiml et al. |
| 8,494,701 | B2 | 7/2013 | Philipp et al. |
| 9,062,618 | B2 | 6/2015 | Rademacher et al. |
| 9,172,247 | B2 * | 10/2015 | Iwasaki ..................... H02J 3/32 |
| 10,054,065 | B2 | 8/2018 | Dextreit et al. |
| 2010/0305805 | A1 | 12/2010 | Yamaguchi |
| 2013/0099576 | A1 * | 4/2013 | Chuah ................. H02J 7/00716 307/80 |
| 2015/0088404 | A1 | 3/2015 | Geissenhoener |
| 2017/0274890 | A1 * | 9/2017 | Mansur ................... B60L 55/00 |
| 2019/0363406 | A1 * | 11/2019 | Yamada ................ H02J 7/0025 |
| 2020/0169104 | A1 * | 5/2020 | Leuthner ................... H02J 7/14 |

FOREIGN PATENT DOCUMENTS

DE 102009040877 A1 * 5/2010 ......... B60H 1/00828

OTHER PUBLICATIONS

General Motors Quietly Installs Keyless Engine Shutoff (5 pages). (Oct. 10, 2018). Retrieved from http://www.safetyresearch.net/blog/articles/general-motors-quietly-installs-keyless-engine-shutoff.

* cited by examiner

*Primary Examiner* — Aniss Chad
*Assistant Examiner* — Mahmoud M Kazimi
(74) *Attorney, Agent, or Firm* — Frank Lollo; Eversheds Sutherland (US) LLP (57) ABSTRACT

Onboard engine control for vehicles is disclosed herein. An example method includes determining a moving average of duty cycle periods for a power component of a vehicle for recent power load events, each of the duty cycle periods having both on-time portions and off-time portions; and when the on-time portions of the moving average are above a predetermined percentage, an engine of the vehicle remains in an on-state condition, further wherein when a current off-time period of the power component exceeds a value equal to a predetermined multiplier applied to the off-time portions, the engine is placed in an off-state condition.

17 Claims, 3 Drawing Sheets

ONBOARD ENGINE CONTROL FOR VEHICLES

TECHNICAL FIELD

The present disclosure relates to power consumption and engine cycling of vehicles. Some embodiments are directed to systems and methods for cycling an engine based on power usage and other conditions.

BACKGROUND

Power to the box features present in some vehicles leverage an assumption that an engine of a vehicle is running. These methods do not consider the impact of intermittent operation of plug-in power consuming products or other intermittent uses. Issues related to auto-starting of an engine have been addressed but once the engine is started, no solution exists for when to cycle or turn the engine off. During intermittent loading/inverter operations, repeated starting of the engine to power the alternator/inverter may deleteriously wear out a battery and starter on the engine.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The systems and methods disclosed herein are configured to selectively alternate an engine between an on-state condition and an off-state condition based on a moving average of duty cycles. The systems and methods provide an intelligent means for determining when an engine may be turned off, in view of a past set of duty cycle periods. Using a moving or rolling average of duty cycle data, a controller of a vehicle can determine when it is advantageous to allow an engine of the vehicle to continue to run (e.g., persist in an on-state condition) or when the engine can be shut off (e.g., transition to an off-state condition). In some embodiments, the systems and methods can also implement boundary conditions or usage conditions to persist the engine in an on-state condition, even if the moving average data indicates that the engine could be shut off.

Generally, systems and methods disclosed herein detect and adjust to intermittent use case of a power to the box feature (e.g., electrical panel or other similar electrical interface of a vehicle) by automatically preventing engine shutoff (which would normally take place) based on an electrical load trigger level and duty cycle of loading (off/on) using a moving average of recent electrical load duty cycles. Some embodiments use a moving average of the last five power usage events to determine when the engine should stay on and when it should shut off. These systems and methods save wear on both the vehicle battery and starter. In some embodiments, if a moving average of recent events is greater than a default of 50% on time (e.g., duty cycle) then the engine can remain in an on-state condition. The engine can be turned off automatically if intermittent use has ceased, such as when an inverter goes more than three times the moving average of duty cycle off-times without power being pulled from the inverter. These systems and methods prevent engine turn off in situations which might damage the vehicle battery. For example, the engine remains on if a battery is outside of normal operating ranges (e.g., boundary conditions). The systems and methods can also prevent inconvenience to vehicle occupants. For example, the engine can remain on if the vehicle is occupied, if climate control is being used, if vehicle lighting is being used, or if a radio of the vehicle is being used (e.g., usage conditions).

Illustrative Embodiments

Figure 1:
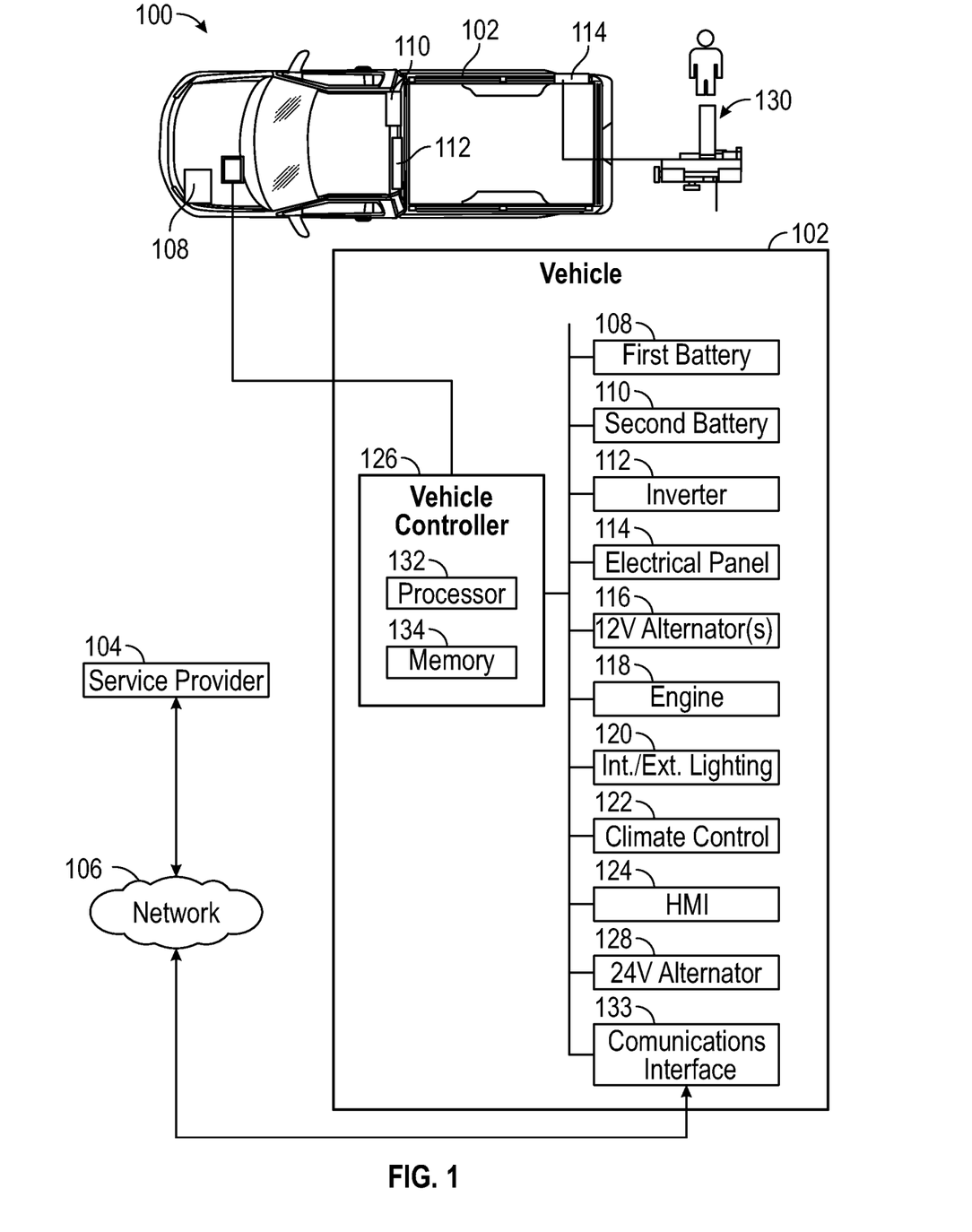
FIG. 1 depicts an illustrative architecture in which techniques and structures for providing the systems and methods disclosed herein may be implemented.

Turning now to the drawings, FIG. 1 depicts an illustrative architecture 100 in which techniques and structures of the present disclosure may be implemented. The illustrative architecture 100 may include a vehicle 102, a service provider 104, and a network 106. The network 106 may include any one or a combination of multiple different types of networks, such as cable networks, the Internet, wireless networks, and other private and/or public networks. In some instances, the network 106 may include cellular, Wi-Fi, or Wi-Fi direct. In some embodiments, some functionalities disclosed herein can be executed entirely at the vehicle level using a vehicle controller. In other embodiments, some functions disclosed herein can be executed entirely at the service provider level. In other embodiments, some functions disclosed herein can be executed cooperatively at the vehicle level and the service provider level together.

Generally, the vehicle 102 comprises a first battery 108, a second battery 110, an inverter 112, an electrical panel 114 (also referred to as a power to the box component), one or more 12 volt alternators 116, an engine 118, internal or external lighting 120, a climate control system 122, a human machine interface (HMI) 124, and a vehicle controller 126. In some embodiments, the vehicle 102 can comprise additional or fewer batteries and/or electrical panels than those illustrated. In one embodiment, the first battery 108 can comprise a single or dual, 12 volt battery that is/are charged by the one or more alternators 116 of the vehicle 102. In various embodiments, the first battery 108 is utilized to power functions of the vehicle such as the engine 118, the internal or external lighting 120, the climate control system 122, and/or the human machine interface 124, as well as other onboard or native components of the vehicle 102. It will be understood that alternators, batteries, and inverters can all be referred to generally as a power component of the vehicle 102. While some embodiments herein refer to power output of the inverter 112 as a means to measure duty cycles of a power to a box feature (e.g., power applied to the electrical panel 114), the power draw or production of other power components can also be monitored and utilized in accordance with the present disclosure.

In various embodiments, the second battery 110 can include a 24 volt battery that may be charged using another 24 volt alternator 128. The electrical panel 114 can comprise one or more types of electrical interfaces that can include one or more 110 volt/20 amp interfaces, one or more 24 volt/30 amp interfaces, or combinations thereof. A user can plug in one or more electrical devices 130 into one of the interfaces of the electrical panel 114. In one embodiment, electrical devices 130 can include a power tool or television—just as examples.

The devices used to draw power from the electrical panel 114 can create loads of varying intensity and duration. In a high-power, short duration example, a 15 A chop saw can be used for 30 seconds to run a load (chop saw, drill, etc.). The 15 A drawn by the chop saw multiplied by 115V is equivalent to 1725 W, which is then divided by 120, which is equivalent to 14.375 W. A 24V battery (7.5 A time 24V is equivalent to 180 W/hours). So it would be reasonable that this load could be created five to eight times before the engine of the vehicle is started to charge the battery. In a low-power example, if a ⅓ horsepower sump pump creates a draw of 1.03 Watt/hours, it can be inferred that this pump could create many duty cycles while only taking 20-50% of the battery power. In general, a battery connected to the inverter has enough power to support an intermittent high power load for a certain number of cycles and small loads for many cycles it is not necessary to always start the vehicle to power the inverter. Such situations depend on the load and for how long it is run.

The electrical panel 114 is powered by the first battery 108 and/or the second battery 110. Each of the first battery 108 and the second battery 110 has a capacity and a state of charge (SOC) that varies over time as power is drawn from the batteries or the batteries are recharged by running of the engine 118, through use of the one or more 12 volt alternators 116 and the 24 volt alternator 128, as would be known to one of ordinary skill in the art. In addition to the electrical panel 114, other additional power interfaces such as direct current (DC) and alternating current (AC) can be located within a cabin of the vehicle 102.

As noted above, the present disclosure involves optimizing on-time conditions and off-time conditions of the engine 118 based on an analysis of duty cycle periods caused by the use of the electrical panel 114 and/or other power interfaces of the vehicle 102. A duty cycle period as utilized herein refers to a portion of time where electrical demands of the vehicle 102 vary based on intermittent power demands caused by the power draws through the electrical panel 114 and/or other power interfaces of the vehicle 102. A duty cycle period includes an on-time portion where power is being output by the vehicle 102 and an off-time portion where power is not being output by the vehicle 102.

Figure 2:
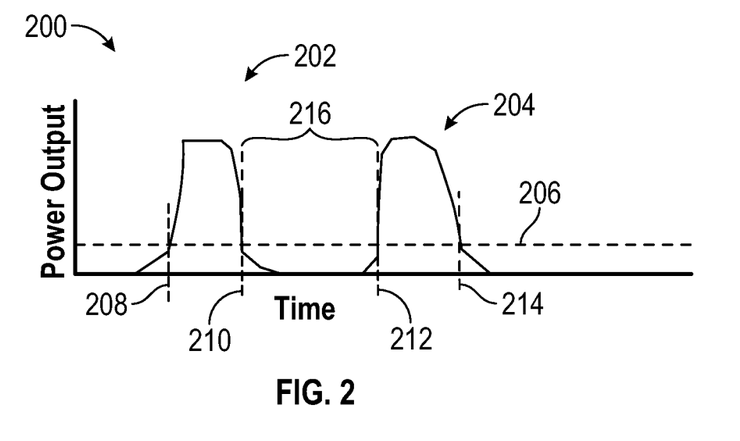
FIG. 2 depicts an exemplary graph illustrating power output versus time in accordance with an embodiment of the disclosure.

Referring now to FIGS. 1 and 2 where two example duty cycle periods are illustrated in graphical format. These duty cycle periods are indicative of a power output of the inverter 112. For example, the power output can be utilized to provide power to the second battery 110 in response to a load created at the electrical panel 114. A graph 200 of FIG. 2 plots power output of the inverter 112 (Y axis) versus time (X axis). Each of these curves represents a power load event and its corresponding duty cycle periods.

A first duty cycle curve 202 is created, for example, when a power tool is coupled with the electrical panel 114 and the power tool is used for a first period of time. A second duty cycle curve 204 is created, for example, when the power tool is used for a second period of time. In various embodiments, a trigger level threshold 206 is established that is measured in amps. The trigger level threshold 206 can be selectable by a user in some embodiments, as will be discussed herein. The trigger level threshold indicates an output level of the inverter 112 above which a power load event can be deemed to have occurred. For example, when a user is utilizing the power tool. The trigger level threshold 206 also indicates an output level of the inverter 112 below which a triggering event can be deemed to have ceased. In one embodiment, an on-time portion begins when the power output of the inverter 112 crosses above the trigger level 206 threshold at time 208. The on-time portion ends when the power output of the inverter 112 crosses below the trigger level threshold 206 at time 210, which is after previously crossing above the trigger level 206 threshold. This period of time is referred to as an on-time portion of a duty cycle period. In sum, an on-time portion is indicative of a time under the duty cycle curve where a power output of the inverter 112 is above the trigger level threshold 206. When a series of these duty cycle curves are available a moving average can be calculated for the on-time portions.

An off-time portion can be calculated from a time 212 when the power output of the inverter 112 crosses below the trigger level threshold 206 relative to the first duty cycle curve 202 to a beginning time 214 of an on-time portion of the second duty cycle curve 204 when the power output of the inverter 112 crosses above the trigger level threshold 206. This period of time illustrated with bracket 216 is referred to as an off-time portion between duty cycle periods. A current off-time period includes any duration of time after which the power output of the inverter 112 has crossed below the trigger level threshold 206, but no additional duty cycle periods or power load events have been encountered.

As devices consume power from the electrical panel 114, loads are created and duty cycle periods can be determined by the vehicle controller 126. In various embodiments, the duty cycle periods are determined by the vehicle controller 126. In some embodiments the vehicle controller 126 can comprise a processor 132 and memory 134. The memory 134 stores instructions that are executed by the processor 132 to perform aspects of duty cycle period analysis and engine control functions which are disclosed herein. When referring to operations executed by the vehicle controller 126 it will be understood that this includes the execution of instructions by the processor 132. In some embodiments, the vehicle controller 126 utilizes a communications interface 133, which allows the vehicle controller 126 to communicate with the service provider 104.

The vehicle controller 126 can calculate duty cycle periods for the vehicle 102 on a moving or rolling average. The number of duty cycle periods included in the moving average can vary based on a user selection. For example, the number of duty cycle periods could include five or ten duty cycle periods. The vehicle controller 126 can update the moving average of duty cycle period data as new duty cycle periods are determined. Thus, the moving average can be updated using a last in, first out process in some embodiments.

The vehicle controller 126 can maintain moving averages of both on-time portions of the duty cycle periods and the off-time portions of the duty cycle periods. Using these data the vehicle controller 126 can determine if the engine 118 should be left in an on-state condition or if the engine 118 should be shut off (e.g., off-state condition). In various embodiments, the vehicle controller 126 can be configured to determine if an amount of significant current or power is being output by the inverter 112. To be sure, a time of significant current or power output is understood to correspond to when the inverter 112 is outputting power in an on-time portion of a duty cycle period, such as when the power level is above the trigger level threshold 206. Conversely, a time of little to no current or power output is understood to correspond to when the inverter 112 is outputting relatively little or no power in an off-time portion of a duty cycle period, such as when the power level is below the trigger level threshold 206.

In some embodiments, when a moving average of prior power load events is greater than a default value of 50% of the on-time portions of the duty cycle periods, the vehicle controller 126 maintains/persists the engine 118 in an on-state condition. On the other hand, if a current off-time period of the inverter 112 exceeds a value equal to a predetermined multiplier applied to the off-time portions, the engine 118 can be placed in an off-state condition by the vehicle controller.

In one example embodiment, if the inverter 112 goes more than three times a moving average of off-time periods of the duty cycle periods without power being output by the inverter 112, the engine 118 can be turned off by the vehicle controller 126. The predetermined multiplier in this example is three, but could be any suitable value selected by a user of the vehicle 102 or by the vehicle controller 126 based on an analysis of historical inverter operations. In some embodiments, the engine 118 is not turned off until the second battery 110 is charged to a SOC value of 80-100 percent.

To be sure, a value of the trigger threshold (see threshold 206 of FIG. 2 as an example), number of trigger events, default on-time duty cycle (e.g., duty cycle of power draw) threshold, and/or predetermined multiplier each have a default value but can be customized to user situations by the user. According to some embodiments, regardless of the moving average with the duty cycles, the vehicle controller 126 can persist or keep the engine 118 in an on-state condition when certain boundary conditions or usage conditions exist.

Example boundary conditions can include, but are not limited to, when a battery temperature that is lower than a lower limit threshold or higher than an upper limit threshold. For example, the lower limit threshold could comprise approximately −20 degrees Celsius and the upper limit threshold could comprise approximately 60 degrees Celsius. Another example boundary condition can include when a battery temperature voltage is lower than a lower limit threshold such as approximately 25 volts. Another example boundary condition can include when a battery SOC voltage is lower than a lower SOC limit threshold such as approximately 60% SOC. In yet another example, a boundary condition can include when direct current and alternating current usage that is greater than a usage threshold such as 400 Watts. In each of these example scenarios, the vehicle controller 126 can keep the engine 118 running regardless of the moving average data of the duty cycle periods.

According to some embodiments, the vehicle controller 126 can detect when a usage condition exists. Example usage conditions exist when the vehicle 102 is occupied by a user. Other example usage conditions include, but are not limited to use of the internal or external lighting 120, the climate control system 122, and/or the human machine interface 124. In each of these example scenarios, the vehicle controller 126 can keep the engine 118 running regardless of the moving average data of the duty cycle periods.

The human machine interface 124 can include a touchscreen display and/or voice control system. A driver can control various features of the vehicle 102 such as audio, navigation, climate control, and the like using the human machine interface 124. In one or more embodiments, the user can select the various parameters disclosed above such as the power trigger threshold level, number of power load events, and default on-time duty cycle (e.g., duty cycle of power draw). While the system can be preprogrammed with default values, tuning allows optimization for specific use cases.

Figure 3:
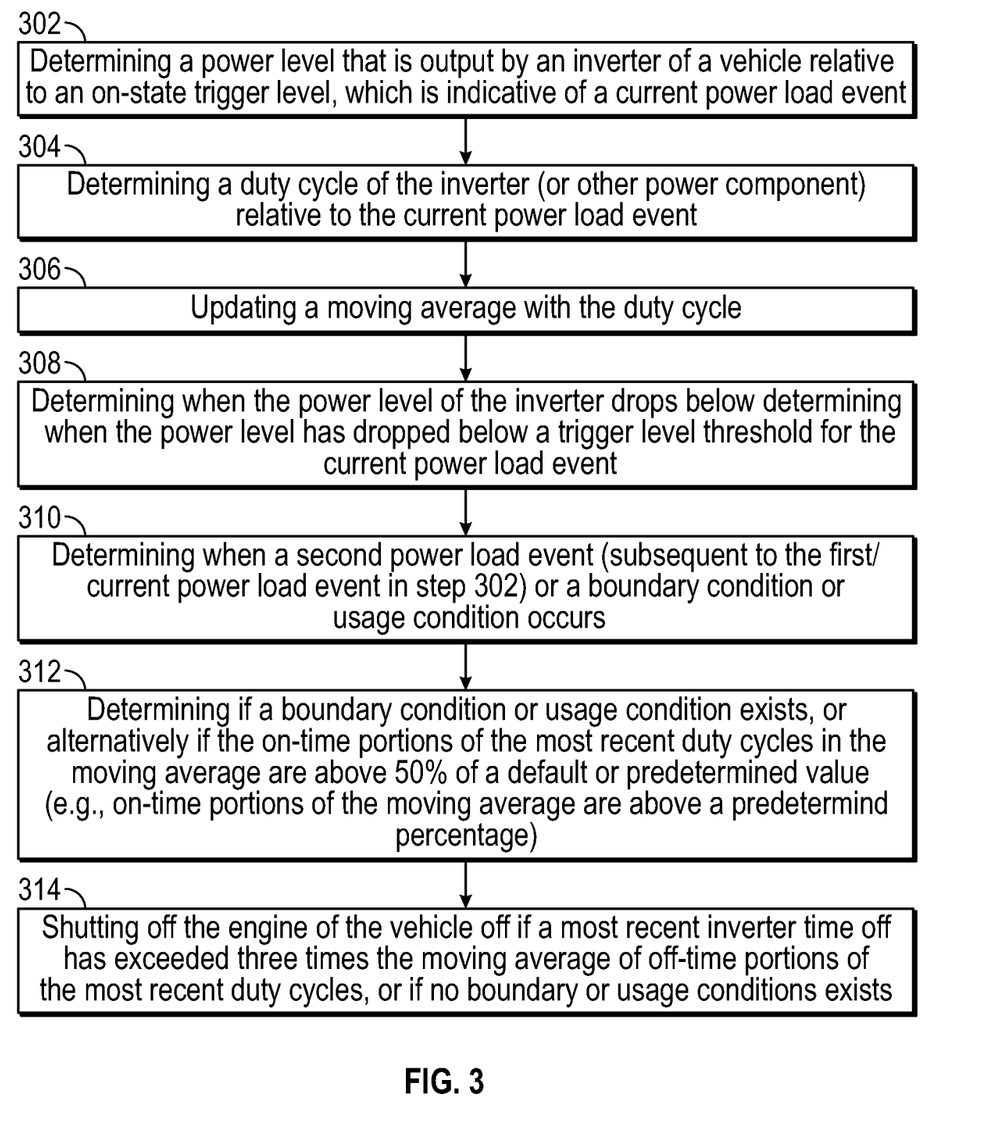
FIG. 3 depicts a flowchart of an example method in accordance with an embodiment of the disclosure.

FIG. 3 is a flowchart of an example method of the present disclosure. The method begins with a step 302 of determining a power level that is output by an inverter of a vehicle relative to a trigger level threshold (see trigger level threshold 206 of FIG. 2 as an example), which is indicative of a current power load event. This power level of the inverter is a current power level. Again, this trigger level threshold can be specified by a user or could be a default or predetermined threshold. The power level could be measured in Amperes or Volts. If the power output is above the trigger level threshold, it is indicative of the beginning of a new duty cycle. The method includes a step 304 of determining a duty cycle of the inverter (or other power component) relative to the current power load event. Again, the duty cycle comprises on-time portions and off-time portions.

Next, the method includes a step 306 of updating a moving average with the duty cycle. The moving average comprises a plurality of duty cycles that includes the duty cycle. For example, the moving average could include data for the five most recent duty cycles for triggering events. In some embodiments, each of the triggering events could be unique and create a unique duty cycle curve. For example, portions of the triggering events could be due to use of a power tool, while some triggering events could be due to use of external vehicle lighting.

In various embodiments, the method includes a step 308 of determining when the power level of the inverter drops below the trigger level threshold. According to some embodiments, the method can include a step 310 of determining when a second power load event (subsequent to the first power load event in step 302) or a boundary condition or usage condition occurs. This process could include determining if a boundary condition or usage condition exists or alternatively if a predetermined time frame has elapsed since a last off-state event for the inverter. Example boundary conditions and usage conditions are disclosed above. In general, the method can include a step 312 of determining if a boundary condition or usage condition exists, or alternatively if the on-time portions of the most recent duty cycles is above 50% of a default or predetermined value (e.g., on-time portions of the moving average are above a predetermined percentage).

In one embodiment, a determination is made relative to the most recent inverter time off (e.g., when the power level of the inverter drops below the trigger level threshold) as determined in step 308. For example, it can be determined if the most recent inverter time off has exceeded three times the moving average of off-time portions of the most recent duty cycles (e.g., last five or ten duty cycles). If the inverter has gone this long without having a threshold exceeding output, the engine of the vehicle can be shut off in step 314. In a further embodiment, the shutting off of the engine may not occur until the battery that is being utilized is recharged to by the inverter to have a SOC of approximately 80 to 100 percent.

Conversely, the engine of the vehicle remains in an on-state condition until a triggering event occurs. That is, if a boundary condition, usage condition, or triggering event does not occur, the vehicle remains in an on-state condition where the engine is running.

Example Embodiments

In some instances, the following examples may be implemented together or separately by the systems and methods described herein.

Example 1 may include a method, comprising: determining a moving average of duty cycle periods for a power component of a vehicle for recent power load events, each of the duty cycle periods comprising both on-time portions and off-time portions; and wherein when the on-time portions of the moving average are above a predetermined percentage, an engine of the vehicle remains in an on-state condition, further wherein when a current off-time period of the power component exceeds a value equal to a predetermined multiplier applied to the off-time portions, the engine is placed in an off-state condition.

Example 2 may include the method according to example 1 and/or some other example herein, wherein the recent power load events are related to a power-to-the-box component of the vehicle and the power component is an inverter.

Example 3 may include the method according to example 2 and/or some other example herein, wherein a number of the duty cycle periods, the predetermined percentage, and the predetermined multiplier are each individually selectable by a user of the vehicle.

Example 4 may include the method according to example 1 and/or some other example herein, further comprising: detecting a boundary condition for a battery of the vehicle; and maintaining the engine in the on-state condition until the boundary condition exists.

Example 5 may include the method according to example 4 and/or some other example herein, wherein the boundary condition comprises a battery temperature that is lower than a lower limit threshold or higher than an upper limit threshold.

Example 6 may include the method according to example 4 and/or some other example herein, wherein the boundary condition comprises a battery voltage that is below a lower voltage limit threshold.

Example 7 may include the method according to example 4 and/or some other example herein, wherein the boundary condition comprises a battery state of charge value that is below a lower state of charge threshold.

Example 8 may include the method according to example 4 and/or some other example herein, further comprising: detecting when a direct current and alternating current usage that is greater than a usage threshold; and maintaining the engine in the on-state condition until the boundary condition exists.

Example 9 may include the method according to example 1 and/or some other example herein, further comprising: detecting when a usage condition exists, the usage condition comprising at least one of an occupied state of the vehicle, climate control operation, lighting operation, radio operation, or exterior lighting operation; and maintaining the engine in the on-state condition until the usage condition exists.

Example 10 may include a system, comprising: a battery; an inverter coupled to the battery; a controller comprising a processor and a memory for storing executable instructions, the processor executing the instructions to determine a moving average of duty cycle periods for a power component of a vehicle for recent power load events, each of the duty cycle periods comprising both on-time portions and off-time portions; and wherein when the on-time portions of the moving average are above a predetermined percentage, an engine of the vehicle remains in an on-state condition, further wherein when a current off-time period of the power component exceeds a value equal to a predetermined multiplier applied to the off-time portions, the engine is placed in an off-state condition.

Example 11 may include the system according to example 10 and/or some other example herein, further comprising a human machine interface, the human machine interface providing selections of a number of the duty cycle periods, the predetermined percentage, and the predetermined multiplier are each individually selectable by a user of the vehicle.

Example 12 may include the system according to example 10 and/or some other example herein, wherein the processor is further configured to: detect a boundary condition for the battery of the vehicle; and maintain the engine in the on-state condition until the boundary condition exists.

Example 13 may include the system according to example 12 and/or some other example herein, wherein the boundary condition comprises a battery temperature for the battery that is lower than a lower limit threshold or higher than an upper limit threshold.

Example 14 may include the system according to example 12 and/or some other example herein, wherein the boundary condition comprises a battery voltage for the battery that is below a lower voltage limit threshold.

Example 15 may include the system according to example 14 and/or some other example herein, wherein the boundary condition comprises a battery state of charge value of the battery that is below a lower state of charge threshold.

Example 16 may include the system according to example 15 and/or some other example herein, wherein the processor is further configured to: detect when a direct current and alternating current usage that is greater than a usage threshold; and maintain the engine in the on-state condition until the boundary condition exists.

Example 17 may include the system according to example 10 and/or some other example herein, wherein the processor is further configured to: detect when a usage condition exists, the usage condition comprising at least one of an occupied state of the vehicle, climate control operation, lighting operation, radio operation, or exterior lighting operation; and maintain the engine in the on-state condition until the usage condition exists.

Example 18 may include a method, comprising: determining a power level that is output by an inverter of a vehicle relative to a first power load event for the vehicle; determining a duty cycle of the inverter relative to the first power load event, the duty cycle comprising on-time portions and off-time portions; updating a moving average with the duty cycle, the moving average comprising a plurality of recent duty cycles; determining when the power level has dropped below a trigger level threshold; and determining when a second power load event or a boundary condition occurs, wherein an engine of the vehicle remains in an on-state condition when the second power load event occurs, further wherein when the second power load event does not occur and a predetermined time frame has elapsed since a last off-state event for the inverter, the engine of the vehicle is placed in an off-state condition.

Example 19 may include the method according to example 18 and/or some other example herein, wherein the boundary condition comprises any of: a battery temperature that is lower than a lower limit threshold or higher than an upper limit threshold; a battery voltage that is below a lower voltage limit threshold; or a battery state of charge value that is below a lower state of charge threshold.

Example 20 may include the method according to example 19 and/or some other example herein, further comprising: detecting when a usage condition exists, the usage condition comprising at least one of an occupied state of the vehicle, climate control operation, lighting operation, radio operation, or exterior lighting operation; and maintaining the engine in the on-state condition until the boundary condition exists.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that stores computer-executable instructions is computer storage media (devices). Computer-readable media that carries computer-executable instructions is transmission media. Thus, by way of example, and not limitation, implementations of the present disclosure can comprise at least two distinctly different kinds of computer-readable media: computer storage media (devices) and transmission media.

Computer storage media (devices) includes RAM, ROM, EEPROM, CD-ROM, solid state drives (SSDs) (e.g., based on RAM), flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. The method, comprising:
    determining a moving average of duty cycle periods for a power component of a vehicle for recent power load events, each of the duty cycle periods comprising both on-time portions and off-time portions, wherein the moving average of duty cycle periods comprises a plurality of duty cycles;
    receiving a predetermined multiplier;
    maintaining, based on the on-time portions of the moving average being above a predetermined percentage, an engine of the vehicle in an on-state condition; and
    placing, based on a current off-time period of the power component exceeding a value equal to the predetermined multiplier applied to the off-time portions, the engine in an off-state condition.

2. The method according to claim 1, wherein the recent power load events are related to a power-to-the-box component of the vehicle and the power component is an inverter.

3. The method according to claim 2, wherein a number of the duty cycle periods used for the moving average, the predetermined percentage, and the predetermined multiplier are each individually selectable by a user of the vehicle.

4. The method according to claim 1, further comprising:
    detecting a boundary condition for a battery of the vehicle; and
    maintaining the engine in the on-state condition until the boundary condition exists.

5. The method according to claim 4, wherein the boundary condition comprises a battery temperature that is lower than a lower limit threshold comprising a predetermined lower temperature or higher than an upper limit threshold comprising a predetermined upper temperature.

6. The method according to claim 4, wherein the boundary condition comprises a battery voltage that is below a lower voltage limit threshold comprising a predetermined number of volts.

7. The method according to claim 4, wherein the boundary condition comprises a battery state of charge value that is below a lower state of charge threshold.

8. The method according to claim 4, further comprising:
    detecting when a direct current and alternating current usage that is greater than a usage threshold; and
    maintaining the engine in the on-state condition until the boundary condition exists.

9. The method according to claim 1, further comprising:
    detecting when a usage condition exists, the usage condition comprising at least one of an occupied state of the vehicle, climate control operation, lighting operation, radio operation, or exterior lighting operation; and
    maintaining the engine in the on-state condition until the usage condition exists.

10. A system, comprising:
    a battery;
    an inverter coupled to the battery;
    a human machine interface at a vehicle configured to receive a predetermined multiplier;
    a controller comprising a processor and a memory for storing executable instructions, the processor executing the instructions to determine a moving average of duty cycle periods for a power component of the vehicle for recent power load events, each of the duty cycle periods comprising both on-time portions and off-time portions, wherein the moving average of duty cycle periods comprises a plurality of duty cycles; and
    wherein when the on-time portions of the moving average are above a predetermined percentage, an engine of the vehicle remains in an on-state condition, further wherein when a current off-time period of the power component exceeds a value equal to the predetermined multiplier applied to the off-time portions, the engine is placed in an off-state condition.

11. The system according to claim 10, the human machine interface providing selections of a number of the duty cycle periods used for the moving average, the predetermined percentage, and the predetermined multiplier to each be individually selectable by a user of the vehicle.

12. The system according to claim 10, wherein the processor is further configured to:
    detect a boundary condition for the battery of the vehicle; and
    maintain the engine in the on-state condition until the boundary condition exists.

13. The system according to claim 12, wherein the boundary condition comprises a battery temperature for the battery that is lower than a lower limit threshold comprising a predetermined lower temperature or higher than an upper limit threshold comprising a predetermined upper temperature.

14. The system according to claim 12, wherein the boundary condition comprises a battery voltage for the battery that is below a lower voltage limit threshold comprising a predetermined number of volts.

15. The system according to claim 12, wherein the boundary condition comprises a battery state of charge value of the battery that is below a lower state of charge threshold.

16. The system according to claim 15, wherein the processor is further configured to:
    detect when a direct current and alternating current usage that is greater than a usage threshold; and maintain the engine in the on-state condition until the boundary condition exists.

17. The system according to claim 10, wherein the processor is further configured to:
- detect when a usage condition exists, the usage condition comprising at least one of an occupied state of the vehicle, climate control operation, lighting operation, radio operation, or exterior lighting operation; and
- maintain the engine in the on-state condition until the usage condition exists.

* * * * *